April 9, 1940.                J. P. WAITE                2,196,649
                               EXCAVATOR
                          Filed Aug. 4, 1938          2 Sheets-Sheet 1

INVENTOR
JOHN P. WAITE

BY

ATTORNEYS

April 9, 1940.  J. P. WAITE  2,196,649
EXCAVATOR
Filed Aug. 4, 1938   2 Sheets-Sheet 2

INVENTOR
JOHN P. WAITE
BY
ATTORNEYS

Patented Apr. 9, 1940

2,196,649

UNITED STATES PATENT OFFICE 2,196,649

EXCAVATOR

John Palmer Waite, Milwaukee, Wis.

Application August 4, 1938, Serial No. 222,960

1 Claim. (Cl. 212—44)

This invention appertains to excavators, and more particularly to a power-operated bucket excavating machine.

Much difficulty is experienced in excavating with power machinery, where the work is being done in confined places, such as behind the trees of a row of trees, which generally line the sidewalks of city streets.

It is, therefore, one of the primary objects of my invention to provide an excavator embodying a telescopic boom for the bucket, whereby the boom can be conveniently lowered in a collapsed position between the trees and then extended in rear of the trees to the desired point of excavating.

Another salient object of my invention is to provide a telescopic boom for excavating machines, with power means for automatically retracting and extending the boom.

A further object of my invention is to provide a telescopic boom for excavating machines embodying an inner section and an outer section slidably mounted on the inner section, with the inner section constructed as a complete cylinder for receiving a piston connected with the outer section, so that upon introduction of pressure in the inner section or cylinder of the boom on one side or the other of the piston, the boom can be extended or retracted as may be desired.

A still further object of my invention is to provide an excavating machine having a telescopic boom of the above character, which will be durable and efficient in use, one that will be simple and easy to manufacture, and one which can be placed upon the market at a reasonable cost.

With these and other objects in view, the invention consists in the novel construction, arrangement, and formation of parts, as will be hereinafter more specifically described, claimed, and illustrated in the accompanying drawings, in which drawings:

Figure 1:
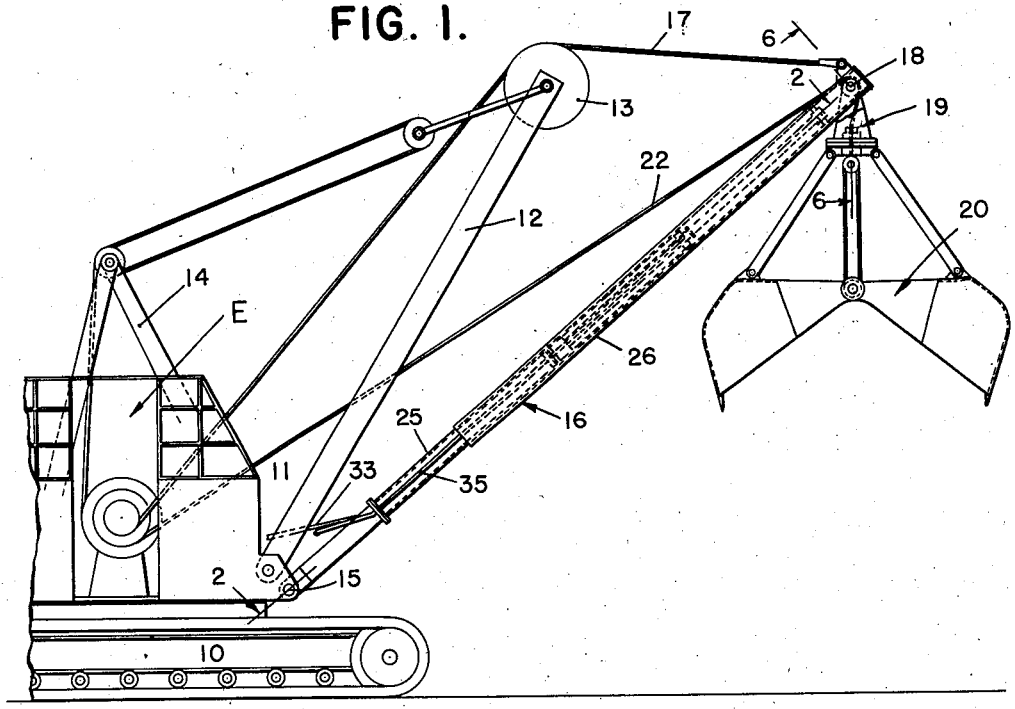
Figure 1 is a fragmentary side elevational view of an excavating machine, showing my improved attachment incorporated therewith.

Referring to the drawings in detail, wherein similar reference characters designate corresponding parts throughout the several views, the letter E generally indicates a power excavator, which can be of any preferred character, size, or make. As illustrated, the excavator E includes the mobile base 10, upon which is rotatably mounted the cab 11 containing the operating machinery. The mobile base 10, in the present instance, is shown to be of the crawler type, but, obviously, wheels can be used in lieu thereof.

Hingedly mounted on one end of the cab is the mast 12 carrying a large sheave or pulley wheel 13 at its upper end. The mast is connected by means of pulleys and cables with the brace frame 14, and the mast can be raised and lowered in any preferred manner.

Rockably mounted on the cab below the mast 12, as at 15, is my novel extension boom 16. The boom 16 is raised and lowered in the conventional manner, and thus the outer end thereof is provided with a cable 17, which is trained over the large pulley wheel 13, carried by the machine. The cable 17 then leads to the hoisting drums in the cab.

The extreme outer end of the boom carries a cross-pin or shaft 18, on which is rockably mounted the head 19 for the clamshell bucket 20. The clamshell bucket 20 is connected to the head 19 by means of a swivel connection 21, whereby the clamshell bucket 20 can be rotated. The bucket is opened and closed in the conventional manner by a cable 22, which leads over a pulley 23 carried by the cross-shaft or pin 18. This cable 22 leads to the hoisting drums.

As stated, all of the above features are more or less in general use, and the same form no part of my present invention.

As set forth in the objects of the specification, the primary feature of the invention resides in the novel construction and arrangement of the boom 16. The boom 16 includes an inner section 25 and an outer section 26, which is slidably mounted on the inner section 25. Thus, a telescoping boom is provided. The inner section 25 for the boom 16 swings on the cab at the point 15, as heretofore mentioned. The outer end of the outer boom section 26 carries the clamshell bucket 20, as described above.

The inner boom section 25 is formed in the nature of a cylinder, and, in fact, the same forms a complete cylinder, and the opposite ends thereof are closed by cylinder heads 27 and 28. The cylinder head 28 is provided with a stuffing box 29, through which slidably extends a piston rod 30. The inner end of the piston rod is connected with a piston 31, which is slidably mounted within the cylinder or inner boom section. The outer end of the piston rod 30 is connected by means of a cross-pin 32 with the outer boom section 26.

By introducing pressure in the outer end of the cylinder, the piston 31 will be caused to travel inward in the cylinder, and carry the sliding boom section 26 therewith. This will telescope the boom. By introducing pressure into the inner end of the cylinder, the piston 31 will be caused to travel to the outer end of the cylinder or boom section 25, and this will cause the extension of the boom.

The inner cylinder head 27 can be provided with a combined pressure and exhaust pipe 32, and the cylinder head 28 can be provided with a combined pressure and exhaust port 34. The port 34 communicates with a longitudinally extending pipe 35, which is mounted within a groove 36 formed in one side of the boom section 25. Air pressure can be utilized for operating the piston 31, or hydraulic pressure can be used. The use of hydraulic pressure may be the most desirable, although steam pressure can also be utilized without departing from the spirit or the scope of my invention.

Figure 7:
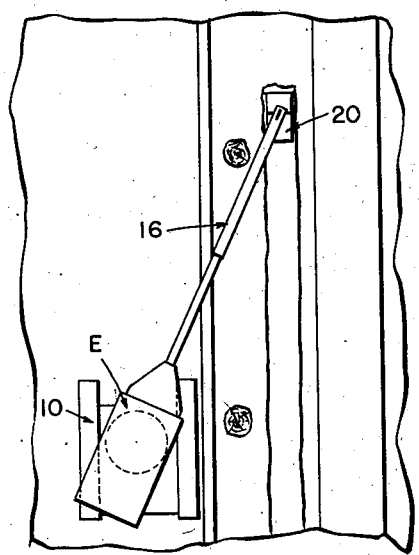
Figure 7 is a diagrammatic view in top plan, illustrating one method of utilizing the excavator.
Figure 6:
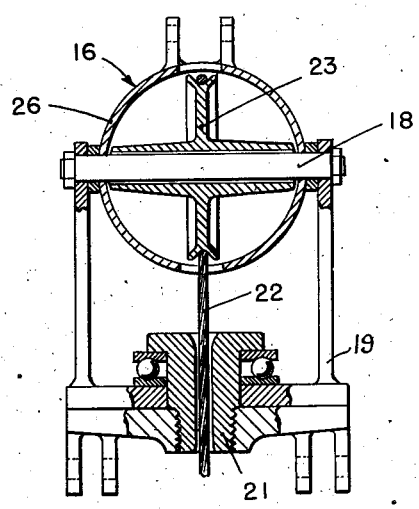
Figure 6 is a detail sectional view taken on the line 6—6 of Figure 1, looking in the direction of the arrows, illustrating the means for mounting the clamshell bucket on the outer end of the boom.

Any preferred means can be utilized for selectively introducing and exhausting pressure from the opposite ends of the cylinder, and this means is preferably arranged within the cab in convenient control of the operator. In Figure 7, I have shown an excavator in the street alongside a row of trees. The boom is shown extended, and a comprehensive idea can be obtained as to how the bucket can be used in rear of the trees without damaging the trees in any way.

Figure 8:
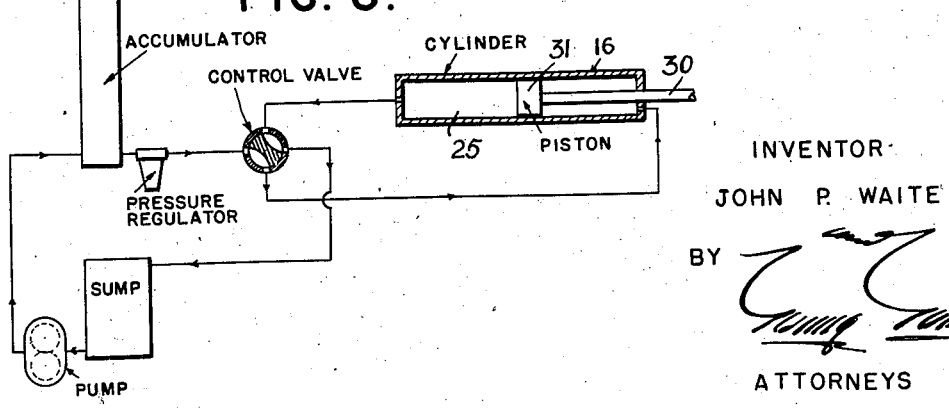
Figure 8 is a diagrammatic view of the hydraulic means employed for controlling and operating the piston.

In Figure 8, I have shown one conventional means for controlling the operation of the boom. As illustrated, a four-way control valve is provided for governing the flow of fluid under pressure to one end of the cylinder, and the exhausting or return of the fluid to the pump. In the illustration, the valve is so set that the fluid under pressure is directed to the outer end of the cylinder, so that the piston will be forced inwardly. This will bring about the retraction of the boom. The fluid on the inner end of the cylinder is being returned to the intake side of the pump.

Figure 2:
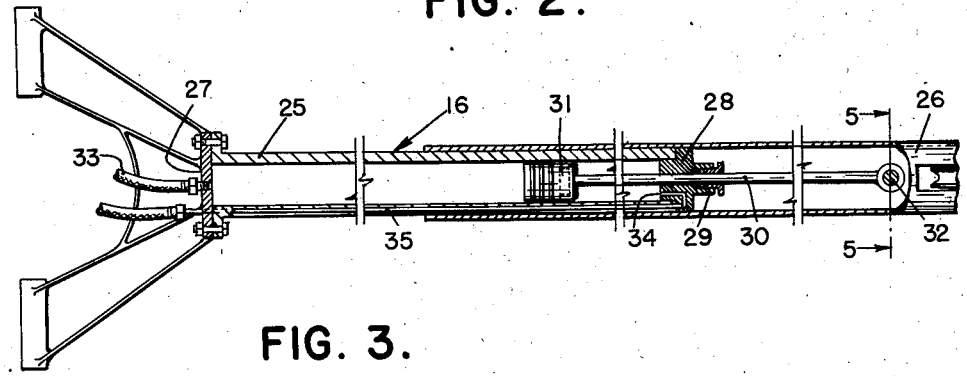
Figure 2 is a longitudinal sectional view through the boom, taken substantially on the line 2—2 of Figure 1, looking in the direction of the arrows.
Figure 3:
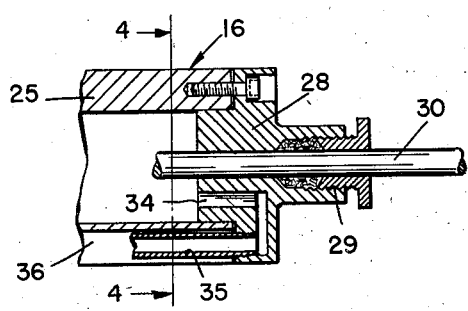
Figure 3 is an enlarged, fragmentary, detail, longitudinal sectional view through the boom, illustrating the construction of the cylinder head for the outer end of the inner boom section.
Figure 4:
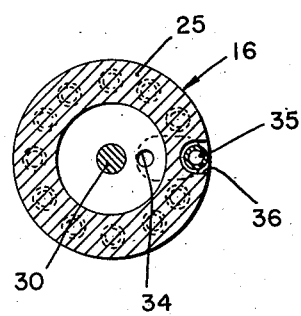
Figure 4 is an enlarged, detail, transverse sectional view through the boom, taken substantially on the line 4—4 of Figure 3, looking in the direction of the arrows.
Figure 5:
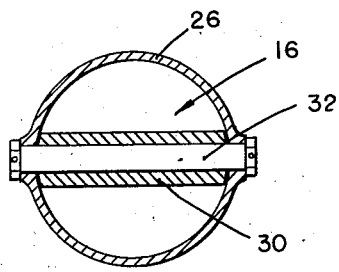
Figure 5 is a transverse sectional view through the boom, taken on the line 5—5 of Figure 2, looking in the direction of the arrows, illustrating the means for anchoring the piston rod to the outer boom section.

The bucket 20 is free to rock longitudinally of the boom and transversely of the boom. The bucket can also rotate around a vertical axis. When the bucket swings transversely, the outer sleeve turns on the inner portion 25 of the boom. As shown in Figure 2, the piston rod 30 can rotate in the piston 31; or, if so desired, the piston rod can turn in a ball-and-socket joint on the cross-pin 32.

Changes in details may be made without departing from the spirit or the scope of my invention, but what I claim as new is:

In an excavating machine, a mobile carriage, an extensible boom on the carriage including inner and outer sections, means pivotally connecting the inner end of the inner section to the carriage, a bucket carried by the outer end of the outer section, said inner section including a tubular body and heads closing the opposite ends of the body forming a cylinder, and said outer section including a tubular body slidably mounted over the tubular body of the inner section for movement longitudinally thereof, a piston slidably mounted in said inner section, a piston rod extending out of the inner section and into the outer section, and means operatively connecting the rod to the outer section and to said piston, said inner section being provided with inlet and exhaust ports on opposite sides of the piston, as and for the purpose specified.

JOHN PALMER WAITE.